United States Patent Office 2,988,131
Patented June 13, 1961

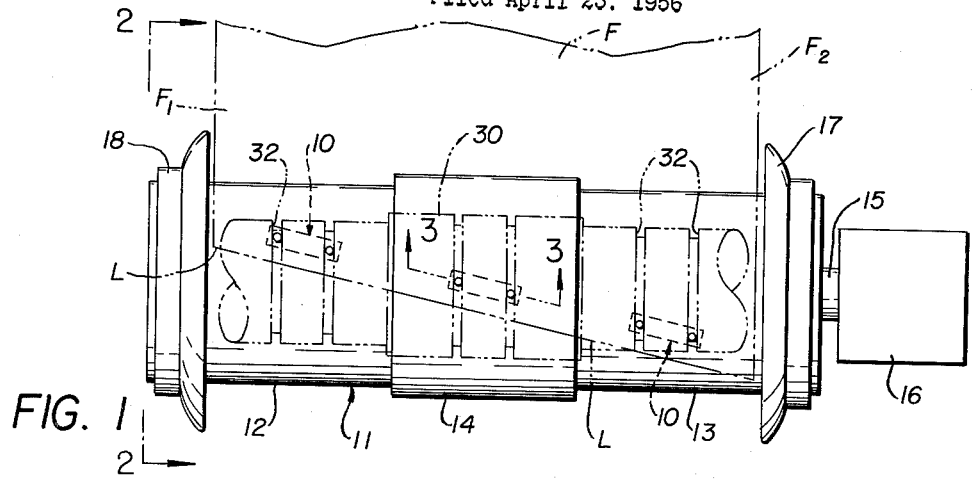
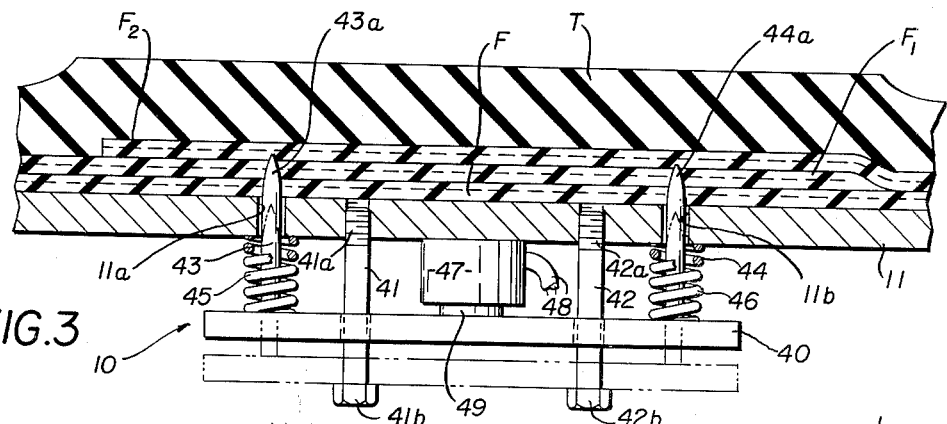
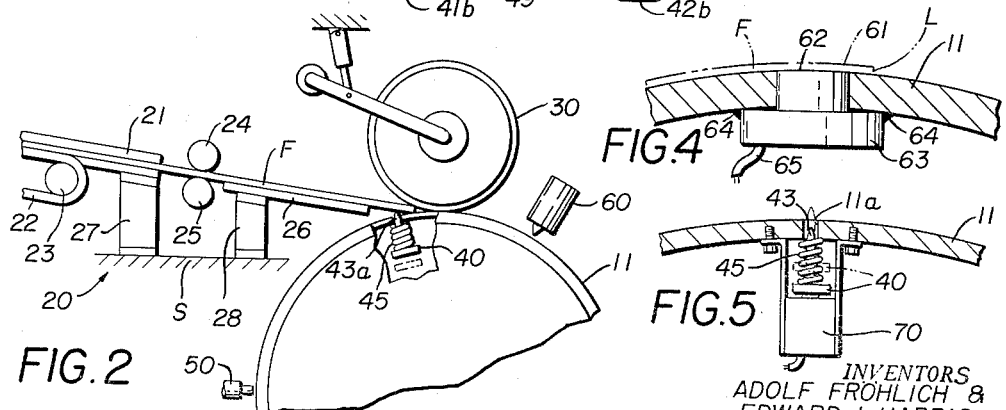
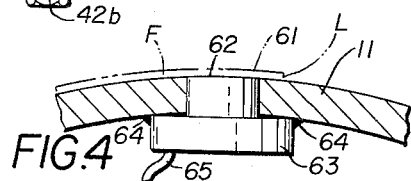
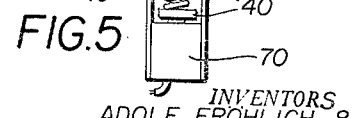

2,988,131
MAGNETIC PLY HOLDER
Adolf Fröhlich and Edward J. Harris, Akron, Ohio, assignors to The Cleveland Trust Company, Cleveland, Ohio, as trustee
Filed Apr. 23, 1956, Ser. No. 579,957
4 Claims. (Cl. 154—9)

This invention relates to the art of pneumatic tire construction and in particular has reference to holding means operable to secure the building ply with respect to the form upon which the same is being built.

In the present day practice of building pneumatic tires, it is believed well-known that the uncured tire carcass is built up in a generally cylindrical form so as to assume a "flat-built" configuration. In this type of operation, a plurality of fabric plies are built up about a cylindrical building drum with the application of the fabric ply being followed by the positioning of the beads, chafer, breaker, and thread strips, all of which are superimposed over the positioned fabric ply.

Because the building drum must be highly polished in order to facilitate removal of the tire after the building operation is completed, particular difficulty has been encountered in the past with respect to the positioning of the first fabric ply. In this regard, it has been difficult to adhere the leading edge of the fabric ply with respect to the building drum, per se. Present day practice in this regard dictates that the same must be more or less manually held down by the tire builder with the building drum being slowly rotated during this manual positioning so as to avoid any slippage. This problem disappears after one ply has been positioned about the drum, due to the fact that the inherent tackiness of the building plies will cause adherence between like plies.

With the advent of wire tire construction, wherein steel or other metallic cord members were employed, the problem of applying the first fabric ply has been particularly intensified due to the fact that this type of fabric ply has metallic cord members that are relatively rigid and which operate to produce a ply member that is stiff and bulky by comparison with known fabric plies of the present day prior art. Thus, where fabric plies of the known prior art could be folded by the operator to assist in manual positioning, it has been found difficult, if not impossible, as a practical matter, to position the leading edge of the first applied wire plies so that the same will not slip upon rotation of the building drum.

It has been found further that with the exception of the above described operation that involves applying the first fabric ply, the construction of a pneumatic tire lends itself to be being performed in a series of automated sequences that can be successively performed without human assistance.

It has been discovered that if the conventional building drum is modified to include fabric ply holders that engage and/or grip the leading and trailing edge portions of the fabric ply, that the overall pneumatic tire-building operation will be simplified.

It accordingly becomes the principal object of this invention to provide a ply-holding mechanism that is capable of utilization in connection with the usual pneumatic tire-building drum and which, when operated, will firmly secure the leading edge of the ply with respect to the building drum without human assistance.

It is the further object of this invention to provide means for securing the leading edge of the first applied fabric to a building drum without human assistance.

These and other objects of the invention will become more apparent upon a reading of the following brief specification, considered and interpreted in the light of the accompanying drawings.

Of the drawings:
FIGURE 1 is a partially schematic plan view of a tire-building machine having the improved fabric ply holding means thereon.
FIGURE 2 is an end elevation partly broke away and in sections and taken on the lines 2, 2 of FIGURE 1.
FIGURE 3 is a section taken on the line 3, 3 of FIGURE 1 and showing the detailed construction of the improved ply holding means.
FIGURES 4 and 5 are vertical sectional views similar to FIGURE 3 but showing modified forms of the invention.

Referring now to the drawings and in particular to FIGURES 1, 2, and 3 thereof, the improved ply holder, generally designated by the numeral 10, is shown carried by a building drum 11 so as to be engageable with the leading edge L of a ply F in a manner to be described.

As is best shown in FIGURES 1 and 2 of the drawings, the building drum 10 is of known type wherein fixed diameter edge portions 12 and 13 coacting with an expandable center portion 14 to set the beads (not shown) of the tire body. A detailed description of a building drum of this type will be found in applicants' co-pending application, Serial No. 559,243, filed January 16, 1956, by Adolf Frohlich and Edward J. Harris. In addition to the aforementioned component parts, the building drum 11 is shown mounted about a central shaft 15 so as to be rotatable in known manner, with respect to pedestal 16. Turnover rings, indicated generally by the numerals 17 and 18, are also shown for the purpose of turning over the opposed side edge portions of the ply that is placed about the building drum, and a detailed description of these turnover rings and their operation will be found in applicants' co-pending application, Serial No. 579,404 filed April 19, 1956, by Adolf Frohlich and Edward J. Harris.

As is best shown in FIGURE 2 of the drawings, the ply F is supplied to the external periphery of the building drum 11 by the use of ply-feeding means indicated generally by the numeral 20. While any one of several types of ply-feeding mechanisms could be utilized, the preferred embodiment of the invention contemplates the use of a ply pan 21, within the cut-out portion of which operates a canvas belt 22, driven in known manner about a pair of pulleys 23, 23. Ply F that is received on the canvas belt 22 and ply pan 21, as shown at the left of FIGURE 2, is delivered between a pair of rollers 24, 25 that rotate in opposite directions to each other in timed coaction with the rotational advance of the building drum 11 so as to dispense, at a pre-determined moment, the leading edge L of the ply onto an auxiliary ply pan 26. Both the ply pan 21 and the auxiliary ply pan 26 are for the sake of clarity shown suspended with respect to a fixed surface by brackets 27, 28. The remaining component parts of the tire machine, per se, include an elongate roller indicated generally by the numeral 30 that includes, as shown in FIGURE 1, a series of axially spaced grooves 32, 32 that co-act with the ply holder 10, as will be presently described.

Referring next to FIGURE 3, and drawings for a detailed description of the ply holder 10, per se, it will be seen that the same includes a plate 40 that is freely shiftable about a pair of stud pins 41, 42 that have their respective threaded ends 41a, 42a threaded into appropriate apertures in drum 11, while the head ends 41b and 42b thereof serve to support the plate 40 in its normal spaced position as shown in chain-dotted lines in FIGURE 3. The plate 40 further includes a pair of pins 43 and 44 that have sharp, pointed ends 43a, 44a respectively. Surrounding these pins are coil springs 45, 46; the arrangement being such that the coil springs 45, 46 continuously urges the plate 40 away from the internal surface of the drum 11 towards the chain-dotted line position of FIGURE 3, with these pins 43 and 44 being received in apertures 11a and 11b provided in the wall of drum 11.

To the end of moving the pins 43, 44 to the full line position of FIGURE 3, the internal surface of drum 11 further includes an electromagnet 47 that is energized by energy supplied through cord 48. In this manner, energization of electromagnet 47 will cause core 49 to be magnetically secured to plate 40.

In use or operation of the improved ply holder, a predetermined length of ply F is first placed upon the ply pan 21 so that the leading edge L thereof is directed towards building drum 11. At this time, the canvas belt 22 may be driven until the leading edge L of the ply F is engaged by the rollers 24, 25. This engagement will cause cessation of the rotation of the canvas belt 22 with a micro-switch (not shown) being capable of use for this purpose. At this time, the drum 11 may be rotated with the electromagnet 47 being energized so that the pointed ends 43a, 44a will project through the drum as shown in full lines in FIGURE 3. At such time as these projecting pins strike a trip 50 (see FIGURE 2), the rollers 24, 25 will be energized to cause resumption of the longitudinal movement of the ply F onto the auxiliary pan 26. Because the trip mechanism 50 may be located at any selected point, the same can be located so that the arcuate distance from the trip 50 to roller 30 is approximately equal to the distance from rollers 24, 25 to roller 30. In this manner the projecting ends 43a, 44a of the pins will contact the leading edge L of the ply F at the moment this leading edge L is being delivered between the drum 11 and the roller 30. At this time, it is apparent that further rotation of the drum 11 will cause the projecting ends 43a and 44a of the pins to pierce the leading edge of the ply F, a short distance from the actual leading edge thereof. At this point, the extreme tip of each pin 43a, 44a will project through the ply F and will be received in the appropriate grooves 32, 32 so that the roller 30 may firmly press the remain ply F onto the exterior surface of the drum 11. Upon further rotation of the drum 11, a spray mechanism, indicated generally by the numeral 60, will be energized to spray the exterior surface of the applied leading edge L with a cement compound, for example.

After rotation has continued for approximately 360°, the trailing edge (not shown) of the ply F will leave the auxiliary pan 26 and will pass under the roller 30 so as to have the underside thereof pass over the projecting ends of the pins 43 and 44, with the roller 30, as a result of the force exerted thereby, cementing this trailing edge to the exposed cemented surface on the leading edge L.

At this time, the ply pan mechanism may be withdrawn in any one of several manners and the central portion 14 expanded to permit a bead setting operation to occur. After the bead setting operation has occurred, the turnover rings 17 and 18 may be alternately operated to position the fabric as shown in FIGURE 3, with edge portion $F_1$ being turned over first by ring 18 in the preferred embodiment discussed herein.

It is to be noted that during the turnover operation just described, the projecting ends, 43, 44a of the pins may be of such length that the same will also pierce the turned over edge portions $F_1$ and $F_2$ so that axial shifting of the ply F with respect to the drum 11 is obviated.

When the tread T has been applied as shown in FIGURE 3, the electromagnet 47 may be de-energized with the result that the springs 45, 46 will withdraw the pins from the ply F so that the same will be recessed in apertures 11a and 11b as shown in chain-dotted lines in FIGURE 3. At this time, central portion 14 may be collapsed and the tire removed in known manner.

In the modified form of the invention shown at FIGURE 4 of the drawings, the ply holder described constitutes an electromagnet that is positioned in drum 11 so that the exterior surface 62 thereof is flush with the external surface of the drum. The base 63 of the electromagnet 61 may be secured as by welds 64, 64 to the internal surface of the drum with cord 65 supplying the current for energization and de-energization of the electromagnet 61.

In operation of this modified form of the invention, the device will be operated substantially as before with fabric ply being delivered beneath the roller 30 as previously described. In this case, however, the electromagnet 60 will be energized at this point so as to cause an electrical attraction with respect to magnetic cord members of the ply F. This magnetic attraction has been found sufficient to firmly adhere the leading edge L of ply F to the building drum, per se.

The modified form of the invention shown in FIGURE 5 of the drawing is similar in many respects to the form of the invention previously described in connection with FIGURES 1 to 3 of the drawings and accordingly, where indicated, like numerals designate like parts. In this modified form of the invention, a solenoid, indicated by the numeral 70, is employed to radially shift the plate 40 with this solenoid 70 replacing the electromagnet 47 described in the drawings.

It will be seen from the foregoing that there has been provided a new and improved type of ply-holding device for effectively retaining the leading edge of the first applied ply with respect to the building drum. It has been shown how this generic concept of providing ply holders in a localized area of the building drum further envisages specific species that include piercing needles and magnetic attraction.

While the foregoing specification has set forth the detailed description of the improved ply holder in accordance with requirements of the patent statutes, it is to be understood that the scope and breadth of this application is not to be so limited. Thus, where the term "ply" is used, for example, it is to be understood that fabric or wire cord members can be used as cords in the ply.

It is to be also understood that the preferred embodiment of the invention has not discussed the application of the second or subsequent plies because of the fact that such plies are easily secured to the first-applied ply as a result of the inherent tackiness of the ply members involved. However, it is to be understood that a second ply holder, disposed at a different bias angle, could be provided for securing the leading edge of the second ply, for example; in cases of complete automation. Such multiple installations of ply holders could, of course, be cycled to alternately operate.

It accordingly follows that modifications of the invention may be resorted to without departing from the spirit hereof or the scope of the appended claims.

What is claimed is:

1. A pneumatic tire building machine of the character described, comprising; a rotatable hollow building drum having an external ply receiving surface and at least one aperture in the wall portion thereof; ply holding means disposed interiorly of said drum adjacent said aperture and including at least one pin disposed axially in said aperture; means disposed interiorly of said drum for shifting said pin axially of said aperture between projecting and retracted positions with respect to the exterior of said drum; said pin normally being urged to said retracted position.

2. The device of claim 1 further characterized by the fact that said last-mentioned means include a plate secured to the interior ends of said pin within said drum; said plate being magnetically shiftable interiorly of said drum, whereby said pin will be projected and retracted upon shifting of said plate.

3. The device of claim 1 further characterized by the presence of roller means axially contacting the exterior surface of said drum and having a parallel axis of rotation, whereby the exterior surface of said roller means may press said ply onto said ply receiving surface of said drum and said pin when the latter is in projecting position.

4. The device of claim 3 further characterized by the fact that said roller has a circumferential undercut within which said pin may pass when projected.

References Cited in the file of this patent
UNITED STATES PATENTS

| | | |
|---|---|---|
| 1,978,620 | Brewster | Oct. 30, 1934 |
| 2,083,370 | Greulich | June 8, 1937 |
| 2,085,863 | Lindbom | July 6, 1937 |
| 2,441,791 | Bostwick | May 18, 1948 |
| 2,517,889 | Kuffler | Aug. 8, 1950 |
| 2,621,740 | Shanley | Dec. 16, 1952 |
| 2,668,572 | Bostwick | Feb. 9, 1954 |
| 2,671,495 | Iredell et al. | Mar. 9, 1954 |
| 2,681,296 | Dobbs et al. | June 15, 1954 |
| 2,753,001 | Page | July 3, 1956 |
| 2,801,439 | Meares | Aug. 6, 1957 |